Feb. 22, 1949.  F. T. COURT  2,462,722
CONTROLLABLE HYDRAULIC POWER LIFT

Filed Feb. 19, 1942  5 Sheets-Sheet 1

INVENTOR
FRANK T. COURT
BY
ATTORNEYS

Feb. 22, 1949. F. T. COURT 2,462,722
CONTROLLABLE HYDRAULIC POWER LIFT
Filed Feb. 19, 1942 5 Sheets-Sheet 2

INVENTOR
FRANK T. COURT
BY
ATTORNEYS

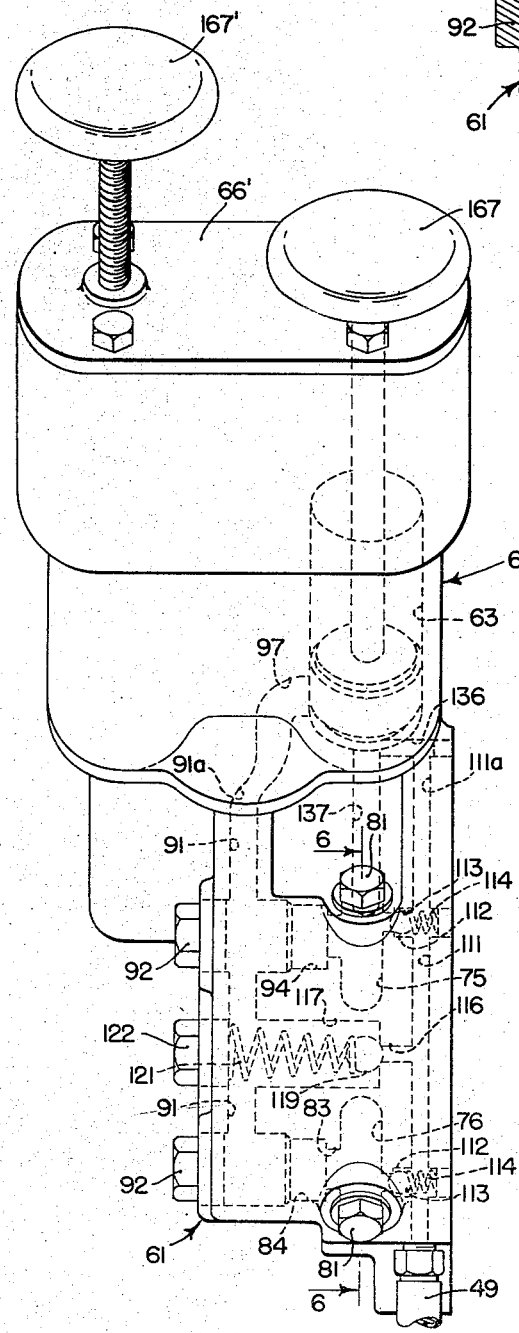
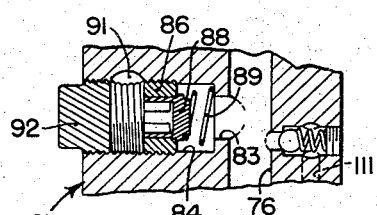
FIG. 7
FIG. 3
INVENTOR
FRANK T. COURT
BY
ATTORNEYS Feb. 22, 1949.   F. T. COURT   2,462,722
CONTROLLABLE HYDRAULIC POWER LIFT
Filed Feb. 19, 1942   5 Sheets-Sheet 4
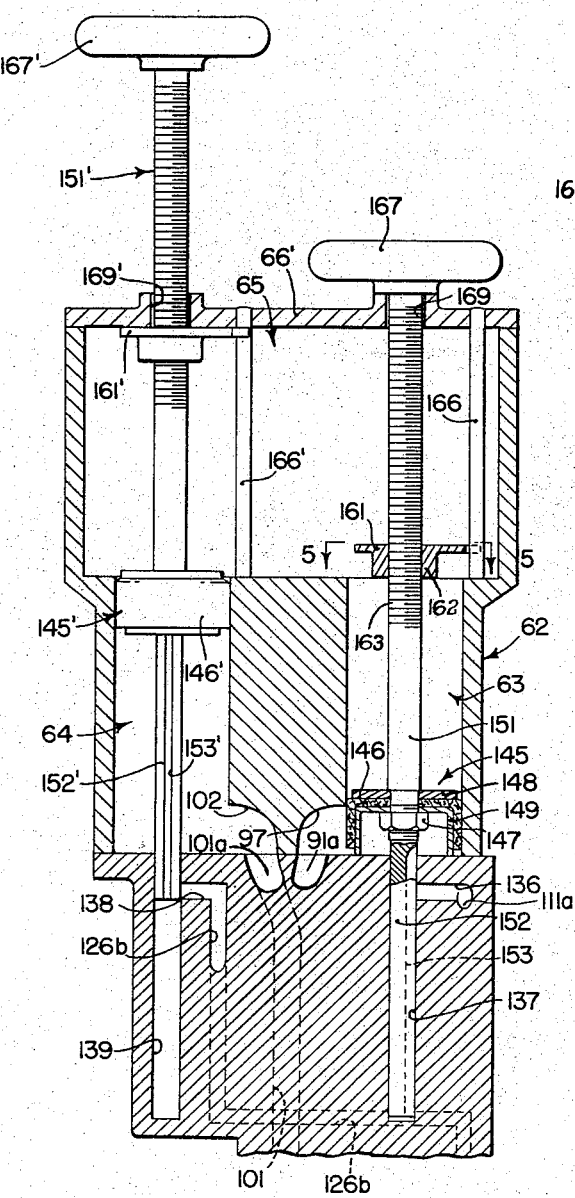
FIG. 4
FIG. 5
INVENTOR
FRANK T. COURT
BY
ATTORNEYS Feb. 22, 1949.　　　　　F. T. COURT　　　　　2,462,722
CONTROLLABLE HYDRAULIC POWER LIFT
Filed Feb. 19, 1942　　　　　　　　　　　5 Sheets-Sheet 5

INVENTOR
FRANK T. COURT
BY
ATTORNEYS

Patented Feb. 22, 1949

2,462,722

UNITED STATES PATENT OFFICE 2,462,722

CONTROLLABLE HYDRAULIC POWER LIFT

Frank T. Court, Moline, Ill., assignor to Deere & Company, Moline, Ill., a corporation of Illinois Application February 19, 1942, Serial No. 431,524

19 Claims. (Cl. 60—52)

The present invention relates generally to agricultrural implements and more particularly to hydraulic mechanism for controlling the lifting and lowering of implement parts, such as, for example, one or more ground working tools into and out of ground working position.

The object and general nature of this invention is the provision of a hydraulic system which includes a working ram unit and a pump for delivering fluid under pressure to said ram unit at working pressures, the pump being of the type wherein it remains in inoperative position so long as no fluid is permitted to flow into the intake of the pump, with a low pressure measuring or metering chamber provided with suitable means for directing metered quantities of fluid under low pressure to said pump which directs the same quantity of fluid under high pressure to said ram unit, whereby a controlled movement of fluid under low pressure is thereby made effective to extend the ram unit against relatively high opposing forces, depending upon the power developed by the pump. More specifically, it is a feature of this invention to provide a metering chamber under low pressure with a movable wall, the movement of which is controlled, preferably manually, and which causes a movement of fluid to a pressure increasing device, such as a pump, which delivers the same amount of fluid under relatively high pressure to a working ram unit. More specifically, it is a feature of this invention to provide a pair of metering chambers and a pair of working ram units arranged for convenient control by the operator of a farm tractor or the like.

Specifically, it is one feature of this invention to provide a pair of interconnected chambers, one constituting a metering chamber under low pressure and the other constituting a working unit under relatively high pressure, with pressure-increasing means interposed therebetween, and with suitable controls whereby the working unit may be extended in order to perform work by causing fluid to flow from the metering chamber to the pressure-increasing means, in which the working unit may be permitted to retract by providing a controlled flow of fluid from the high pressure chamber to the low pressure or metering chamber, by-passing the pressure-increasing means. In this connection, it is a further feature of this invention to provide an adjustable stop effective to limit the amount of fluid that may be returned to the metering chamber, thereby effectively controlling the amount of movement of the working unit in one direction, such as the lowering direction when associated with agricultural tools. Another important feature of this invention is the provision of conveniently controlled means for recharging the interconnected high and low pressure chambers so that they are filled with working fluid at all times.

Another particular feature of this invention is the provision of a metering chamber formed by a free piston and an adjustable piston movable within a cylinder, this forming an adjustable metering chamber which controls the amount of extension and retraction of the associated working ram unit.

These and other objects and advantages of the present invention will be apparent to those skilled in the art after a consideration of the following detailed description, taken in conjunction with the accompanying drawings, in which Figure 1 is a perspective view of an agricultural implement in which the principles of the present invention have been incorporated;

Figure 3 is another view of the unit shown in Figure 2;

Figure 4 is a sectional view of the reservoir and the two metering chambers, being a section taken generally along the line 4—4 of Figure 2;

Figure 5 is a section taken along the line 5—5 of Figure 4;

Figure 7 is a section taken generally along the line 7—7 of Figure 2 showing details of the pump intake valve.

Figure 1:
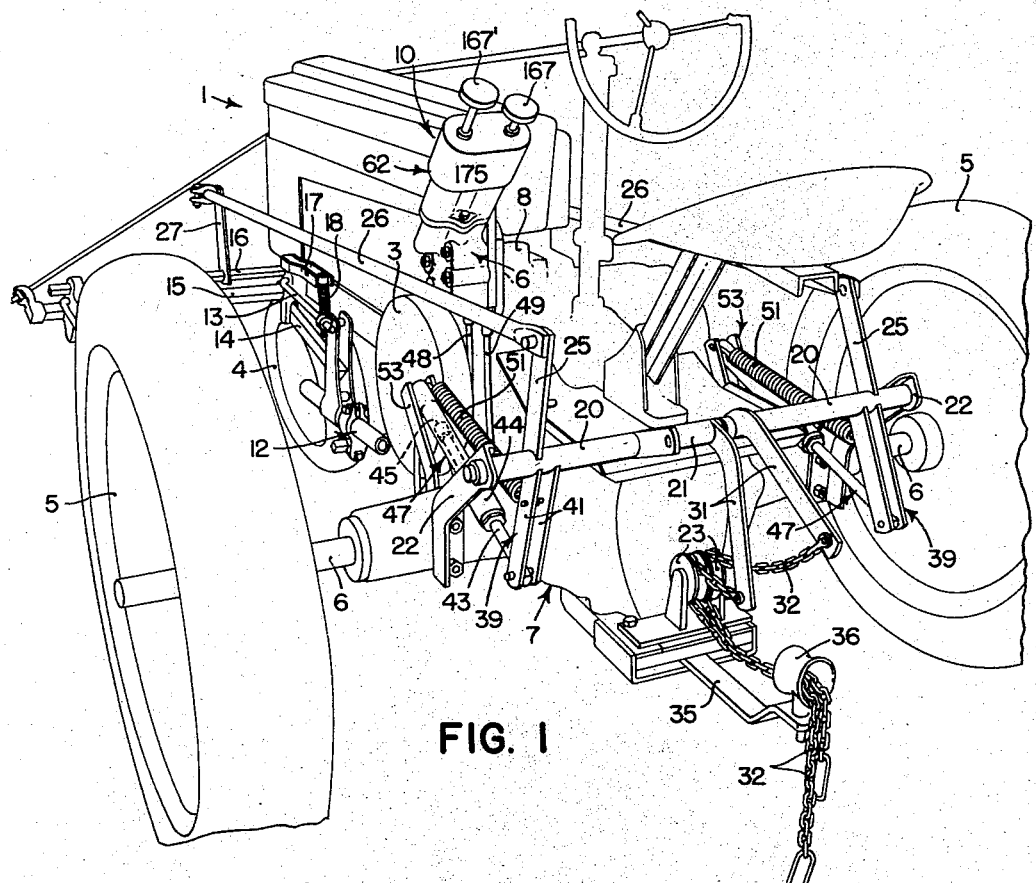

Referring now more particularly to Figure 1, the present invention is shown as incorporated in an agricultural implement comprising a tractor 1 of more or less conventional construction, embodying a frame, a motor 3 and supporting means including front wheels 4 and rear wheels 5, the latter being mounted on axle shafts 6 journaled in a rear axle construction 7. The tractor 1 also includes a governor housing, indicated by the reference numeral 8 and which includes a gear that provides a convenient point at which to attach a unit of the power lift mechanism that forms the principal part of the present invention, such unit being indicated in Figure 1 by the reference numeral 10. The tractor 1 serves as supporting means for ground working tools, represented by a cultivator rig 12, the latter being connected by links 13 and 14 with a laterally outwardly extending draft bar 15, and the latter carries a rock shaft 16 to which an arm 17 is fixed. The arm 17 is connected by suitable link means 18 to raise and lower the cultivator rig 12. For convenience of illustration, the shovels of the cultivator rig 12 have been omitted, and it is to be understood that a plurality of such cultivator rigs and associated parts are provided.

At the rear of the tractor 1 a pair of rock shafts 20 are mounted, one for the cultivator rigs or other tools at each side of the tractor. The rock shafts 20 are connected together at their inner ends for relative rocking movement by any suitable means, such as a sleeve 21, and at their outer ends the rock shafts are supported by brackets 22 bolted to the rear axle of the tractor. An arm 25 extends upwardly from each of the rock shafts 20 and is connected by a lift pipe 26 to an arm 27 fixed to the associated rock shafts 16 at the front of the tractor, whereby rocking movement of each rock shaft 20 acts to raise or lower the associated tools at the front of the tractor. The rock shafts 20 are also provided with arms 31 at the rear of the tractor and which extend generally downwardly, each being connected to a chain 32 and each chain passing over a sheave 23 carried on the tractor drawbar support. The drawbar of the tractor is indicated at 35 and carries a guide ring 36 through which the chains 32 extend for attachment to other implements or parts to be controlled, as may be desired, by the rock shafts 20. Each rock shaft 20 also includes a lifting arm 39, each consisting of a pair of straps welded or otherwise secured at their upper ends to the associated rock shaft 20. The rear end of a piston rod 43 is pivotally connected to the lower end of each lifting arm 39, the rod 43 moving within a cylinder 44 and carrying at its inner end a piston 45. The piston and cylinder constitute a working ram unit 47, to which reference will be made below, there being two such units, one at each side of the tractor. Fluid under pressure is conducted to each ram unit 47 by any suitable means, such as a pair of hose connections 48 and 49 which lead, respectively, from the unit 10 to the left and right hand ram units 47, respectively. An assisting spring 51 is connected with the lifting arm 39 at each side of the tractor and each spring has its forward end connected to a bracket 53 upon which the forward end of the ram unit 47 associated therewith is swingably mounted. Each bracket 53 is fixed to the forward side of the rear axle part to which the associated rear bracket 22 is connected.

The metering chamber and pump unit 10 comprises a pump body 61, preferably a casting, and a second casting 62 forming a pair of metering chambers 63 and 64, and a reservoir 65, the latter being closed by a closure plate 66'. The pump casting is formed with a central transverse opening 66 in which a cam 67 mounted on a rotatable pump shaft 68 is disposed. The shaft 68 extends outwardly of the pump housing 61 and is adapted to be connected with suitable means within the governor housing 8 (Figure 1) on the tractor to be driven from the tractor motor 3. The unit 10 is adapted to be attached to the tractor governor housing by any suitable means (not shown). Communicating with the central bore 66 are four cylindrical bores 73, 74, 75 and 76, each constituting a cylinder of a pump and each including a pump piston 78 movable therein. The outer end of each of the pump cylinders 73—76 is closed by a plug 81, and in between each plug and its associated piston or pump plunger 78 is a spring 82 that biases the associated pump plunger for movement toward the cam 67. As best shown in Figure 3, one side of the pump cylinder 76 communicates through an opening 83 with an inlet chamber 84 (Figure 7) into which is threaded a valve body 86. Movable in the valve body is a valve close 88 biased for movement toward closed position by a spring 89 surrounding the opening 83 between the pump cylinder 76 and the inlet chamber 84. The outer end of the inlet chamber communicates with an inlet bore 91, this portion of the pump casting being closed by a plug 92. As best shown in Figure 3, the inlet bore 91 extends upwardly through the pump housing 61 and into communication with the corresponding inlet chamber 94 for the other pump cylinder 75 at that side of the pump housing. The inlet bore for the two pump cylinders 75 and 76 continues upwardly through the pump casting 61, as indicated at 91a in Figure 3, and registers with a laterally directed duct 97 (Figure 4) formed in the metering chamber casting 62 and communicating with the lower end of the metering chamber 63. Thus, the metering chamber 63 is in communication with the inlet chambers 84 and 94 of the pump cylinders 75 and 76, which are arranged at one side of the pump housing 61.

Figure 2:
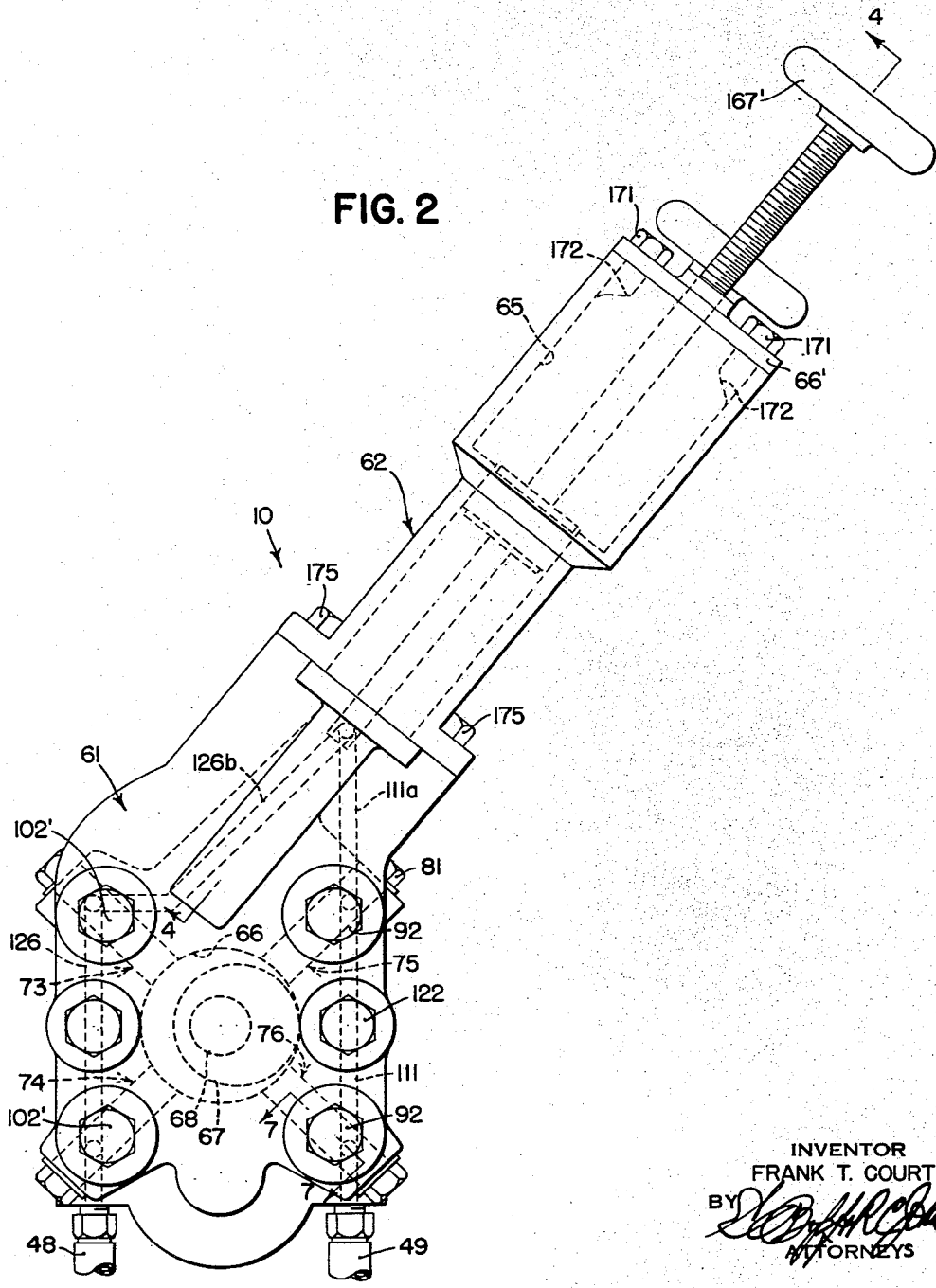
Figure 2 is an enlarged view of the reservoir, metering chamber and pump unit employed in the construction shown in Figure 1.

The pump cylinders 73 and 74 at the other side of the pump casing 61 are of substantially the same construction as described above in connection with cylinders 75 and 76, each of the pump cylinders 73 and 74 having intake chambers corresponding to intake chambers 84 and 94 and which, through intake valves substantially identical with the valve structure shown in Figure 7, communicate with the other metering chamber 64 (Figure 4) through an upwardly extending bore 101 which, at its upper end is directed laterally, as at 101a in Figure 4, registering with a laterally directed bore or duct 102 which leads into the other metering chamber 64. The intake chambers for the pump cylinders 73 and 74 are closed by plugs or caps 102', as shown in Figure 2. The details of the two metering chambers 63 and 64 will be referred to below.

Referring again to the two pump cylinders 75 and 76 (Figures 3 and 6), these two cylinders communicate with a high pressure duct 111 through valve controlled openings 112, each valve consisting of a check ball 113 and a backing spring 114, as best shown in Figure 3. The valve balls 113 thus open outwardly away from the associated pump cylinder and toward the high pressure duct 111 so as to admit oil into the latter when the associated pump plungers 78 are operating. Substantially midway between the two check valves 113 is a port 116 leading outwardly from the high pressure duct 111 and into a relief valve chamber 117. A relief valve ball 119 normally closes the opening 116, being held in closed position by a relatively strong spring 121 that at its outer end bears against a plug 122 that closes the outer end of the relief valve chamber 117. The relief valve 119 functions to open communication between the high pressure duct 111 and the low pressure side or intake conduit whenever the pressure in the duct 111 becomes abnormally high, as by stoppage of some of the ducts or for some other reason.

The other pump cylinders 73 and 74 communicate with a high pressure duct arrangement in substantially the same manner as just described. A bore 125 leads inwardly from the pump cylinder 73 and communicates with a high pressure duct 126, the other pump cylinder 74 also communicating with the high pressure duct 126 by a bore 127. Midway between the two bores 125 and 127 is a bore 129 that leads to a relief valve chamber 131 which contains a spring biased relief valve 132, the ball valve 132 and spring being of substantially the same construction as shown in Figure 3.

The first mentioned high pressure duct 111 extends upwardly, as at 111a (Figure 3), and joins a lateral bore 136 (Figure 4) that leads into a piston stem receiving chamber 137. Likewise, the other high pressure duct 126 leads upwardly in the pump casing 61, as at 126a (Figure 6), and 126b (Figure 4), joining a lateral duct 138 which, like the bore 136, communicates with a piston stem receiving chamber 139. The piston stems disposed, respectively, in the chambers 137 and 139 are formed to serve as valves associated with the ducts 136 and 138 forming the upper termini of the high pressure ducts 111 and 126, as will be referred to below.

Figure 6:
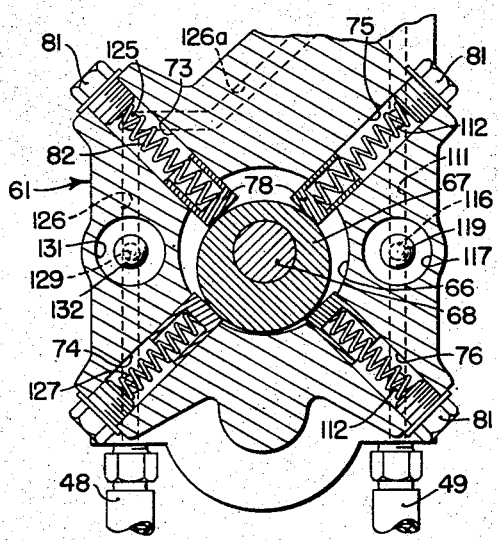
Figure 6 is a sectional view showing the cam actuated suction controlled pump, Figure 6 being a section taken generally along the line 6—6 of Figure 3 and looking in the direction of the arrows.

Referring now more particularly to Figure 4, the metering and reservoir chamber 62 includes, not only the two metering chambers 63 and 64, but also the reservoir 65 which is disposed above and normally is in open communication with the upper ends of the metering chambers 63 and 64. Disposed within the metering chamber 63 is a piston indicated in its entirety by the reference numeral 145 and which includes a cup-shaped leather 146 of usual construction secured by lock nuts 147 between a pair of backing members 148 and 149, the whole being mounted on the lower end of a piston rod 151. The rod 151 is extended, as at 152, to form the stem referred to below and which is normally disposed in guiding relation in the associated piston stem chamber 137. The stem 152 is provided with a long groove 153 that extends upwardly and communicates with the lower portion of the metering chamber 63, as best shown in Figure 4. Thus, by turning the piston rod 151, the groove 153 in the stem 152 may be turned to open communication between the ducts 111 and 136 and the metering chamber 63. As best shown in Figure 6, the lower portion of the duct 111 communicates with the hose 49 that leads to the right hand ram unit, and the other high pressure bore 126 communicates at its lower end with the other hose 48 that leads to the left hand ram unit 47. Thus, whenever the piston rod 151 is turned to bring the slot or groove 153 into registry with the duct 136, liquid may flow from the ram unit associated therewith through the hose 49 and the duct 111 into the metering chamber 63, which thus forces the piston 145 outwardly relative to the metering chamber 63. The outward movement of the piston is limited by a plate 161 that has a portion 162 in threaded engagement with the threaded portion 163 of the rod 151. The plate 161 has a portion 165 engaging a rod 166 that is fixed in position in the reservoir 65 alongside the upper end of the piston rod 151 and serves to keep the plate 161 from turning. Therefore, by turning the piston rod 151, the stop plate 151 may be moved in one direction or the other along the piston rod 151. A knob or hand wheel 167 is fixed to the outer end of the piston rod 151.

The other metering chamber 64 is provided with a piston construction which, for all practical purposes, is substantially identical with the construction just described, and therefore the same reference numerals with a prime added have been used to indicate similar parts. A further description of the piston structure for the left hand metering chamber 64 is believed to be unnecessary. It is to be noted that while the piston rods 151 and 151' are threaded into the associated stop plates 161 and 161', the piston rods 151 and 151' are slidable through apertured bosses 169 and 169' in the reservoir cover plate 66'. The latter preferably is held in place by a pair of cap screws 171 threaded into tapped bosses 172. The reservoir and metering chamber casting is preferably fixed to the pump casting 61 by a similar means, including cap screws 175.

The operation of this form of the invention is substantially as follows.

Referring first to the right hand ram unit 47 and the two pump cylinders 75 and 76, and associated parts, including the metering chamber 63, it will be observed that the piston 145 is in its lowermost position, in which all of the fluid, preferably oil, has been exhausted from the metering chamber, and that the ram 147 is in an extended relation, raising the cultivator rigs at the right side of the tractor, as shown in Figure 1. The cylinder of the associated ram unit is of the same volumetric capacity as the associated metering chamber so that when all of the oil is out of the metering chamber, the ram unit is in its fully extended position, and when all of the oil is in the metering chamber, the ram unit is in its lowermost or retracted position. Therefore, as shown in Figures 1 and 4, the metering chamber 63 is empty and the ram unit 47 at the right side of the tractor is in its fully extended position, raising the associated tools and extending the associated assisting spring 51. Assuming, first, that the operator desires to lower the right hand tools, all that he needs to do is to turn the hand wheel 167 in a clockwise direction, which swings the groove 153 of the piston stem 152 around into a position in which the groove registers with the duct 136. This duct is in communication with the duct 111 (Figure 6), and the latter is in communication with the hose 49 leading to the right hand ram unit 47. Therefore, the oil in the ram cylinder flows upwardly into the metering chamber 63 under the influence of the weight of the associated tools and the force stored in the assiting spring 51. As the oil enters the metering chamber 63 the piston 145 rises, this movement continuing until the stop plate 161 comes into engagement with the plate 66' closing the upper end of the reservoir 65. This prevents any further outward movement of the piston 145 and therefore prevents any further lowering of the tools at the right side of the tractor. It will therefore be seen at this point that the position of the stop plate 161 along the piston rod 151 determines the lowered position of the associated tools. For example, if it should be desired to lower the tools an additional amount, all that the operator has to do is to turn the piston rod 151 in a counterclockwise direction, which permits the further upward movement of the piston 145, and therefore permits a further flow of oil from the ram unit into the metering chamber 63. Under the conditions just assumed, the piston 145 and associated parts will therefore move into a position corresponding to the position of the piston 145' and its associated parts. Referring now to the piston 145' and the metering chamber 64, it will be clear from the above description that the metering chamber 64 is full of oil from the left hand ram unit 47 and that the latter is in a lowered position, corresponding to the position of adjustment of the stop plate 161'. Assume that it is now desired to raise the left hand tools. All the operator has to do is to push inwardly on the knob 167', thus forcing the piston 145' inwardly and moving oil downwardly through the intake ducts 102, 101a, 101 (Figure 4) and into the intake chambers of the pump cylinders 73 and 74 (Figure 6). It can be noted from Figure 6 that the pump mechanism shown is of the cam actuated suction controlled type. That is, the inner ends of the pump plungers 78 merely ride along the cam 67 but do not necessarily reciprocate within the associated cylinders unless oil is admitted past the associated intake valves 88 (Figure 7). In the construction shown, the springs 89 are of sufficient strength to hold the intake valves 88 closed against the head of liquid in the unit and the suction produced by the springs 82 and the weight of the associated pistons and other parts. Therefore, unless positive pressure is applied, no oil normally enters the pump and hence the plungers 78 remain in their radially outwardly disposed or retracted position, the springs 82 being weaker than the intake springs 89. However, when positive pressure is applied, as by pushing inwardly on the piston rod 151', the piston 145' forces oil out of the metering chamber 64 and into the pump cylinders 73 and 74. This permits the plungers 78 to move outwardly. The cam 67 is a constantly rotating part, and therefore the rotation of the cam then is effective to reciprocate the plungers 78 and therefore forces oil outwardly under relatively high pressure through the high pressure passages 125 and 127 and through the high pressure duct 126 into the hose 48 leading to the left hand ram unit 47 (Figure 1). The oil under pressure cannot escape upwardly through the ducts 126a, 126b (Figure 4) and 138 because the operator will make sure that the groove 153' will be turned out of registry with the duct 138a. The operator may therefore raise the cultivator rigs 12 by any amount that he desires, for as long as the operator forces oil out of the metering chamber 64 and into the pump, the latter delivers the same quantity of oil but under high pressure into the ram unit 47. The operator can at any time stop pushing on the piston rod 151', and as soon as positive pressure is terminated, the pump no longer receives oil and therefore stops pumping oil into the associated ram unit. Normally, however, the operator pushes on the piston rod 151' until the metering chamber 64 is empty, or substantially so, thus raising the rigs to their full height, or substantially to their full height. If any of the lifting parts should become jammed or upon the occurrence of some other inadvertence, damage to the parts is prevented by the relief valves 119. The left hand ram unit 147 may be lowered at any time by the operator turning the piston rod 151' so as to bring the groove 153' into registry with the duct 138, whereupon oil flows back from the ram unit into the metering chamber 64, in substantially the same manner as described above in connection with the metering chamber 63.

Mention above was made of the fact that the volumetric capacity of the metering chamber is substantially the same as the capacity of the associated ram unit. It may occur that, by virtue of leakage at the pump or past the pistons of the metering cylinder or the ram unit, or both, that some of the oil may be lost from the normally closed circuit that comprises the metering chamber and the associated ram cylinder. In that event, when the operator presses the metering chamber piston, such as the piston 145', downwardly and forces all of the oil in the metering chamber to the pump, the latter serving to direct the oil under high pressure to the ram unit, the latter will not be extended its full amount. In that case additional oil may be caused to enter the system by the operator manually pulling outwardly on the piston rod. This will cause oil from the reservoir 65 to be drawn into the metering chamber past the leather 146', thus recharging the system. Usually, only a stroke or two will be necessary.

Figure 8:
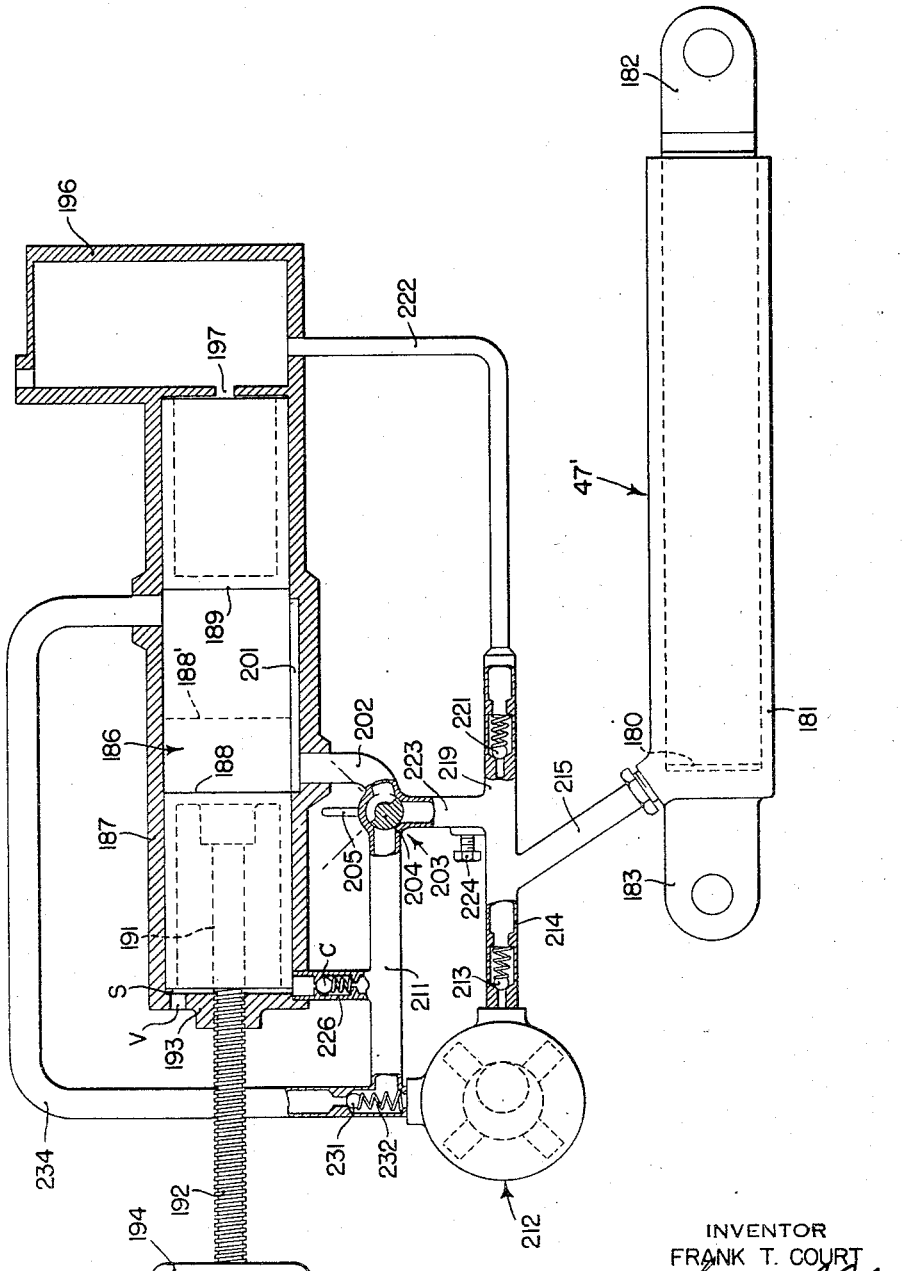
Figure 8 is a diagrammatic view of a modified form of the present invention.

In Figure 8 I have shown a modified form of the present invention in which the operator is not required to manually force a piston down into the metering chamber for causing the ram unit to be extended. Referring now to Figure 8, the ram unit is indicated by the reference numeral 47' and comprises a piston 180 operating in a ram cylinder 181, the piston 180 and cylinder 181 having attaching lugs 182 and 183 by which the ram 47' may be attached to parts to be controlled thereby. The metering chamber is indicated by the reference numeral 186 and comprises an elongated cylinder 187 in which a pair of pistons 188 and 189 are movably mounted. The piston 188 includes a piston rod 191 which is threaded, as at 192, and extends in threaded relation outwardly of the end 193 of the cylinder 187. A handle or knob 194 is fixed to the outer end of the piston rod 191. Attached to the cylinder 187, preferably at one end thereof, is a reservoir 196 which is open at its upper end to atmosphere and at its lower end communicates through an opening 197 with the end of the cylinder 186 in which the piston 189 is disposed. The piston 189 is a free piston and moves back and forth according to the withdrawal of oil from the metering chamber 186 or the return of oil thereto, as will be described below. A groove 201 is formed in the lower portion of the metering chamber 186 and is only slightly shorter than the length of the piston 189 for a purpose which will be referred to later. A conduit 202 leads from the groove 201 to a three-way valve construction indicated in its entirety by the reference numeral 203. The three-way valve 203 includes a rotatable plug 204 operated by a handle 205 and movable from an intermediate position into either of two optional positions, as shown by dotted lines in Figure 8. A conduit 211 leads from the three-way valve 203 over to the intake of a pump 212 which preferably is of the same construction as the pump shown in Figure 1—7, and therefore a further description is not necessary. The pump 212 discharges past a check valve 213 into a high pressure conduit 214 which is connected by a conduit 215 to the ram unit 47'. The conduits 214 and 215 communicate with a conduit 219 that includes a high pressure emergency relief valve 221 that is connected by a tube 222 to the reservoir 196. A conduit 223 in which is incorporated an adjustable restricting valve 224, leads from the conduit 219 to the three-way valve 203. A branch conduit 226 connects with the rear end of the cylinder 187, back of the piston 188 and serves to drain any oil that may leak past the piston 188 back to the conduit 211 leading to the intake of the pump 212. The conduit 211 connects to the pump intake between the pump and a check valve 231 which is held by a relatively light spring 232 to its seat, and an overflow pipe 234 leads from the check valve 231 to the upper portion of the metering chamber 186. Like the valve springs 89, the spring 232 is sufficiently strong to hold the check valve 231 closed against the head of liquid in the reservoir 196 and suction created by the pump plunger springs and the weight of the piston 189 (in the event that the casing 187 is not horizontal).

The operation of the form of the invention shown in Figure 8 is quite similar to the form of the invention described above. The pump 212 is of the same type as described above, namely, a type in which the pump plungers are held in their retracted position, and therefore out of contact with the constantly rotating cam, unless oil is let into the intake of the pump. The position of the parts shown in Figure 8 represents the neutral or non-pumping position, the cylinder being shown as substantially emptied of oil while the metering chamber 186 is shown as filled with oil. Assuming that it is desired to raise the implement parts or otherwise cause the ram unit 47' to be extended, the operator turns the valve 205 to the left. This permits oil to flow from the metering chamber 186 through the conduit 202 and the conduit 211 to the intake side of the pump 212. The oil flows by gravity out of the chamber 186 and into the pump, whereupon the oil is then delivered at relatively high pressure past the check valve 213 and through the conduit 215 into the cylinder 181. At any time that the operator desires to terminate the extension of the ram unit 47', all that he has to do is to return the valve 205 to the intermediate position shown. As the oil flows out of the metering chamber 186, the free piston 189 approaches the adjusting or control piston 188, this movement taking place by virtue of the atmospheric pressure acting on the surface of the oil in the reservoir 196, the oil level lowering as the oil from the reservoir passes through the opening 197 and in back of the free piston 189. Assuming that the operator leaves the valve handle 205 in its left hand position, with the oil flowing from the metering chamber 186 to the pump 212, the ram piston 180 will be extended and as the oil drains away from the metering chamber 186 the free piston 189 approaches the piston 188. In the position shown, the piston 189 does not contact the control piston 188 until all of the oil has been removed from the metering chamber 186 and delivered to the ram unit 47'. However, as soon as the piston 189 engages or reaches the control piston 188, further operation of the pump 212 terminates because there is no more oil available to be admitted into the pump 212. The piston 180 of the ram unit 47' is held in extended position by the check valve 213 and by the fact that the valve 204 closes off communication between the conduit 202 and the conduit 223 both in the intermediate position of the valve handle 205 and in its left hand position. It is therefore not necessary for the operator to move the valve handle 205 from its left hand position to its intermediate position in order to stop the extension of the ram piston 180, since the pump 212 will stop operating the moment there is no further oil available to the pump. However, it will be necessary for the operator to turn the valve 204 from its raising position over to its lowering position, with the handle 205 in the right hand position as viewed in Figure 8, in order to permit the oil from the ram cylinder 181 to flow back to the metering chamber 186. When the valve handle 205 is swung over to its right hand position, communication is established between the conduit 223 and the conduit 202 leading to the metering chamber 186. This establishes a connection between the ram cylinder and the metering chamber but by-passes the pump 212 and permits the ram piston 180 to be moved back into the cylinder 181. This movement is, however, under the control of the adjustable restricting valve 224 which to a greater or lesser extent closes off the passage and prevents the ram piston from moving too rapidly into its retracted position. Normally the load connected with the ram piston is available for moving the piston back to its retracted position, but in the event that the load does not act in this manner, suitable retracting springs or the like may be connected with the ram piston 180, in much the same manner that the springs 51 are connected in Figure 1.

If it should occur that after the operator has turned the valve handle 205 over to its left position, admitting oil from the metering chamber 186 to the pump 212 until the free piston 189 comes up against the end of the control piston 188, the ram unit 47' is not extended to its full extent, due to loss of fluid from the system by leakage or the like, the operator may recharge the system and extend the ram unit 47' to the maximum merely by turning the knob 194 to the left, which retracts the control piston 188 a slight distance, which is possible by virtue of the space S (Figure 8). This permits the free piston 189 to move to the left and thus at its right end open the right end of the groove 201 to communication with the oil from the reservoir 196. Therefore, the oil from the reservoir flows through the groove 201 and the open valve 204 into the pump 212 and therefore continues to extend the ram unit 47'. When the extension is complete, the operator may turn the valve 204 back to its neutral position, full lines, Figure 8, or he may terminate the recharging by turning the knob 194 to the right, thus moving the control piston 188 back to the position shown in Figure 8, which will move the free piston 189 to the right a distance sufficient to close the right end of the groove 201. A vent V provides for movement of the control piston 188 without restriction at the rear side thereof. A check valve C prevents leakage out through the drain conduit 226, space S and vent V when fluid is admitted to the line 211.

With the parts arranged as shown in Figure 8, and with the ram unit 47' in its fully retracted position and the metering chamber 186 full of oil, if it should be desired to move the ram plunger 180 outwardly an intermediate amount, the control piston 188 is moved inwardly, or to the right, by turning the knob 194. This forces oil from the metering chamber around through the conduit 234 and past the check valve 231 into the pump 212, the valve 204 being left in its intermediate or locked position, as shown in Figure 8. The discharge from the pump 212 then passes the check valve 213 and into the cylinder 181, extending the ram plunger 180 an amount which is the same as the quantity of oil forced by the right hand movement of the control piston 188. If the operator desires, this movement may be terminated at any time merely by terminating the movement of the piston 188, the ram being held in its partially extended position by the check valve 213, the closed valve 204, and the closed high pressure emergency relief value 221. It will be observed that the ram plunger 180 may at any time be extended the full amount merely by opening the valve 204 by swinging the handle 205 to the left. Then the remaining oil in the metering chamber 186 flows to the pump and hence is delivered by the latter under pressure to the ram 47', the free piston 189 moving to the left until it comes into engagement with the end of the control piston 188. The system may be operated with the control piston left in that position, such as the position indicated by the dotted line 188' referred to above, merely by operating the valve 204 in the usual manner, namely, to the right when it is desired to lower the ram unit 47' back to its intermediate position, as determined by the dotted line position of the control piston 188, and moving the valve handle 205 to the left when it is desired to raise. It will be noted that when the valve handle 205 is swung to the right, opening communication between the ram cylinder 181 and the metering chamber 186, the pressure of the load on the ram unit 47' is transmitted to the oil in the metering chamber 186. This oil under pressure tends to flow around through the conduit 234 and into the pump 212 past the check valve 231 and into the pump 212, so that as long as the valve 205 is left in its right position, the pump continues to operate, but the ram is held in its intermediate position, due to the fact that the pump 212 is designed so that it has a greater volume per unit time than is permitted to pass through the restriction valve 224 per unit time. However, under such condition, the pump is required to operate under load until the valve 204 is returned from its right hand position over to its neutral position. In the form of the invention shown in Figures 1–7 pressure in the ram units 47 cannot cause oil to be forced to the pump because the grooves 153 and 153' (Figure 4) are normally turned away from the ducts 136 and 138 at all times except when actually lowering the tools.

While I have shown and described above the preferred structure in which the principles of the present invention have been incorporated, it is to be understood that my invention is not to be limited to the particular means shown and described above but that, in fact, widely different means may be employed in the practice of the broader aspects of my invention.

What I claim, therefore, and desire to secure by Letters Patent is:

1. Hydraulic control mechanism for agricultural machines and the like, comprising a cam-type suction controlled fluid pump having spring loaded intake valves, a working cylinder and piston unit having a working chamber with a given volumetric capacity and adapted to receive fluid under pressure from said pump, means providing a measuring chamber having substantially the same volumetric capacity as said cylinder and piston unit, means for delivering a measured quantity of fluid from said measuring chamber to said pump, said fluid delivering means including means for applying pressure against the fluid in said measuring chamber, the loaded valves of said pump being loaded to a degree that prevents the pump intake valves from opening except when positive pressure is applied to the fluid in said measuring chamber, and means for varying the volumetric capacity of said measuring chamber so as to control the amount of fluid delivered by said pump to said cylinder and piston unit.

2. A hydraulic system comprising a working ram unit including a piston and a cylinder, a fluid pump of the type wherein the pump operates only when fluid is permitted to enter the pump, a metering chamber having a piston therein and a stem on which the piston is mounted, conduit means between said chamber and said pump, means for moving said piston to force fluid to flow to said pump, connections between said pump and said ram unit for causing fluid entering said pump from said metering chamber to be delivered to said ram unit under working pressure, a connection between said ram unit and said metering chamber and by-passing said pump to provide for a return flow of fluid from the ram unit to said chamber, and valve means controlled by movement of said stem for controlling said return flow.

3. A hydraulic system comprising a working ram unit including a piston and a cylinder, a fluid pump of the type wherein the pump operates only when fluid is permitted to enter the pump, a metering chamber having a pair of pistons therein defining a closed space therebetween, one of said pair of pistons being a free piston, means controlling the position of the other piston of said pair, a valve controlled connection between said metering chamber and said pump for controlling the flow of fluid from said chamber to said pump, connections between said pump and said ram unit for causing fluid entering said pump from said metering chamber to be delivered to said ram unit under working pressure, a reservoir open to atmosphere at its upper end and communicating at its lower end with said free piston at the side opposite said metering chamber, the head of fluid in said reservoir acting against said free piston to move fluid to said pump when said valve controlled connection between the metering chamber and said pump is opened, a valve controlled connection between said ram unit and said metering chamber and by-passing said pump to provide for a return flow of fluid from the ram unit to said chamber, an auxiliary connection between said metering chamber and said pump normally closed by a biased valve, the bias of which is sufficient to hold the latter valve closed against the head in said reservoir, said auxiliary connection providing for the movement of fluid from said metering chamber to said pump by movement of said controlled piston, and means providing for a flow of fluid from said reservoir to said pump dependent upon the exhaustion of fluid from said metering chamber.

4. In a hydraulic system, the combination of a pump comprising a piston, means for driving the piston in one direction to discharge fluid under pressure from the pump and spring means for moving the piston in the other direction when fluid is available to enter the pump, a low pressure chamber adapted to contain a measured amount of fluid, a hydraulic power utilizing device adapted to receive a measured amount of fluid under high pressure from said pump, means for continuously driving said first means, a piston movable inwardly and outwardly of and forming one wall of said chamber, adjustable means limiting the outward movement of said piston so as to limit the amount of fluid permitted to be returned to said chamber, and controlling valve means for controlling flow of fluid from said low pressure chamber to the intake side of said pump and from said device to said chamber, said spring means being ineffective to draw fluid into the pump when said valve means is closed.

5. In a hydraulic system, a cylinder and piston unit having a given maximum displacement, a pump unit for receiving fluid under low pressure and directing the same under high pressure to said piston and cylinder unit, a fluid container having substantially the same effective displacement as said cylinder and piston unit, controlled connections between said container and said pump for admitting fluid under low pressure to said pump and causing the latter to deliver the same quantity of fluid under high pressure to said cylinder and piston unit, by-pass connections providing for the return flow of fluid from said cylinder and piston unit back to said container a piston axially movable in one direction in said fluid container for forcing fluid therefrom to said pump unit to be delivered under high pressure to said cylinder and piston unit, means connected with said piston for moving the same axially, said last mentioned means being movable in another direction, and valve means interconnected with said last mentioned means and operated by movement thereof in said other direction for controlling said by-pass connections.

6. In a hydraulic system, a working ram unit including a cylinder having a maximum capacity, a low pressure chamber having substantially the same capacity as said cylinder, power driven means adapted to receive fluid from said low pressure chamber, a piston having a normal range of movement in said low pressure chamber and movable in one direction therein to deliver fluid under low pressure to said power driven means so as to be delivered under high pressure to said cylinder, a reservoir, manually operated means for moving said piston in the other direction beyond its normal range of movement in that direction, and means forming a connection therefrom opening into said low pressure chamber beyond the normal range of movement of said piston in said other direction, whereby movement of the piston in said other direction serves to cause fluid to flow from said reservoir to said low pressure chamber in order to fill the latter with fluid in the event the quantity of fluid initially in said low pressure chamber does not entirely fill said cylinder.

7. A hydraulic system comprising a low pressure cylinder, a pair of pistons therein, each movable from an extended position toward the other piston, a working ram unit including a cylinder and piston therein, the capacity of the ram cylinder when the piston thereof is extended being substantially equal to the volume in said first-named cylinder between the pistons therein when the latter are in their extended positions, a pump adapted to draw fluid from said first cylinder and deliver the same under high pressure into the ram cylinder, one of said pistons in said first cylinder being a free piston and movable toward the other piston as the pump withdraws fluid from the space therebetween, said pump ceasing operation when all of the fluid between said pistons has been withdrawn therefrom and delivered to said ram cylinder, and means for moving said other piston so as to vary the effective capacity of said first-mentioned cylinder, and thereby vary the amount the pump is permitted to move the ram piston.

8. The invention set forth in claim 7, further characterized by a reservoir and means for providing for a flow of fluid from said reservoir to said pump and by-passing said free piston so as to deliver fluid under pressure to said ram cylinder after all of the fluid has been pumped out of the space between said pair of pistons in said first mentioned cylinder when said other of the pair of pistons is in a retracted position.

9. Apparatus for use in moving an operating unit of an agricultural implement or the like from one position into any one of a number of other positions, comprising a closed hydraulic system that includes a ram adapted for connection with said unit, a chamber having a movable wall, a fluid pump of the type which operates only when fluid is delivered thereto and which includes intake valve means biased for retention in a closed position whereby no fluid is admitted to the pump unless it is directed thereto with a force sufficient to overcome the bias of said valve means, a fluid connection between said ram and chamber, and means placing said pump in the connection between said ram and chamber, the quantity of fluid in said closed system being substantially constant, whereby the position of the ram determines the position of the movable wall, and vice versa, means accessible externally of said system and connected with said movable wall by which sufficient force may be exerted on the latter for overcoming the bias of said intake valve means and forcing fluid from said chamber into said ram for extending the latter, the bias of said biased valve means being sufficient to overcome the head of liquid in said chamber when no force is applied to said movable wall, and means for adjusting the position of said wall so as to vary the amount of fluid that may be returned from said ram to said chamber, thereby causing said ram and the operating unit connected therewith to take various positions.

10. A hydraulic system comprising a ram, a pump, a measuring chamber, biased valve means disposed between said pump and measuring chamber for controlling the flow of fluid to said ram and to prevent any flow of fluid to said pump from said chamber unless positive pressure is applied to the fluid in said chamber sufficient to overcome said biased valve means, means for applying positive pressure to the fluid in said chamber for thereby causing fluid to flow to said pump and thence to said ram unit, a fluid conduit leading into said pump between the latter and said biased valve means, and means for supplying fluid through said conduit to said pump independent of said biased valve means and said pressure applying means.

11. A hydraulic system comprising a ram, a pump, a measuring chamber, biased valve means disposed between said pump and measuring chamber for controlling the flow of fluid to said ram and to prevent any flow of fluid to said pump from said chamber unless positive pressure is applied to the fluid in said chamber sufficient to overcome said biased valve means, means for applying positive pressure to the fluid in said chamber for thereby causing fluid to flow to said pump and thence to said ram unit, and a valve-controlled by-pass for directing fluid to said pump independent of said biased valve means whereby operation of said valve controlled by-pass serves to cause said pump to deliver fluid under pressure to said ram independent of said biased valve means.

12. A hydraulic system as defined in claim 11, further characterized by said valve-controlled by-pass including a three-way valve, and a conduit means leading therefrom to said ram, said three-way valve being disposable in a position for conducting fluid from said ram to said measuring chamber.

13. A hydraulic system comprising a ram, a pump, a measuring chamber, biased valve means disposed between said pump and measuring chamber for controlling the flow of fluid to said ram and to prevent any flow of fluid to said pump from said chamber unless positive pressure is applied to the fluid in said chamber sufficient to overcome said biased valve means, valve controlled means establishing a by-pass between said ram and chamber, and combined means for controlling said valve controlled by-pass means and applying positive pressure to the fluid in said chamber for thereby causing fluid to flow from said pump and thence to said ram unit.

14. In hydraulic mechanism, a hydraulic device actuable by a liquid under pressure, a variable volume chamber for liquid, an adjustable wall closing one side of said chamber, means for adjusting the position of said wall so as to vary the volume of said chamber, a controllable by-pass between said chamber and device providing for a return flow of liquid from said device to said chamber in a quantity which depends upon the adjusted position of said movable wall, a pump connected with said chamber and device and of the type adapted to deliver to said device only the quantity of liquid which flows thereto from said variable volume chamber, whereby the adjustment of the movable wall controls the amount of liquid pumped to said device and the extent of operation of the latter, and means carried by said movable wall for operating said adjusting means.

15. Lifting apparatus comprising a cylinder and piston unit, a fluid pump of the type adapted to discharge fluid under pressure whenever fluid is admitted to the pump and to remain in non-operating position when no fluid is admitted to the pump, a metering chamber having a capacity substantially the same as the capacity of said piston and cylinder unit and having one wall consisting of a movable piston, means for moving said piston to reduce the volume of said metering chamber and force fluid therein to said pump, whereby the latter delivers fluid under pressure to said piston and cylinder unit, the amount of extension of the latter depending upon the amount of movement of the piston in said metering chamber, connections establishing a controlled flow of fluid from said piston and cylinder unit back to said metering chamber around the pump, said piston in said metering chamber moving outwardly to accommodate the return of fluid to said metering chamber, and adjustable stop means cooperating with the piston in said metering chamber for limiting the amount of fluid that can be returned to said metering chamber, thereby limiting the return movement of said piston and cylinder unit.

16. Lifting apparatus comprising a cylinder and piston unit, a fluid pump of the type adapted to discharge fluid under pressure whenever fluid is admitted to the pump and to remain in non-operating position when no fluid is admitted to the pump, a metering chamber having a capacity substantially the same as the capacity of said piston and cylinder unit and having one wall consisting of a movable piston, means for moving said piston to reduce the volume of said metering chamber and force fluid therein to said pump, whereby the latter delivers fluid under pressure to said piston and cylinder unit, the amount of extension of the latter depending upon the amount of movement of the piston in said metering chamber, a reservoir, and means providing for a flow of fluid from said reservoir into said metering chamber in response to an outward movement of the piston in said metering chamber for recharging the latter so as to maintain a substantially constant amount of fluid in the metering chamber and piston and cylinder unit.

17. In a hydraulic system adapted to be mounted on a tractor, a hydraulic pump driven from the tractor motor, a chamber containing fluid to be delivered to said pump, the latter including intake valve means biased to remain closed under the normal head of fluid in said chamber, means accessible to an operator at the operator's station on the tractor for applying positive pressure to the fluid in said chamber so as to overcome the bias of said valve means and force fluid in the chamber to said pump, conduit means extending from said chamber around said biased intake valve means, and a valve for controlling said conduit means operated by said means for applying pressure to the fluid in said chamber.

18. In a hydraulic system adapted to be mounted on a tractor, a hydraulic pump driven from the tractor motor, a chamber containing fluid to be delivered to said pump, the latter including intake valve means biased to remain closed under the normal head of fluid in said chamber, means for applying positive pressure to the fluid in said chamber so as to overcome the bias of said intake valve means and force fluid in the chamber to said pump, a ram operatively connected with said pump to receive fluid under pressure therefrom, and means including a three-way valve and connections between the valve and said chamber, pump and ram whereby fluid may be caused to flow from said ram directly into said chamber, by-passing said pump, the connection between the three-way valve and said pump being effectede between the pump and said biased intake valve means, whereby said three-way valve may be utilized to direct fluid from said chamber into said pump independently of said pressure applying means at the operator's station on the tractor.

19. Apparatus for moving an operating unit of an agricultural implement or the like from one position into any one of a number of other positions, comprising a closed hydraulic system that includes a working ram unit having a cylinder with a maximum capacity, a low pressure chamber having substantially the same capacity as said cylinder, power driven means adapted to receive fluid from said low pressure chamber, a piston in said low pressure chamber and movable in one direction therein to deliver fluid under low pressure to said power driven means which delivers the fluid under high pressure to said cylinder, a reservoir, means whereby movement of the piston in said chamber in the other direction serves to cause fluid to flow from said reservoir into said closed hydraulic system so as to fill the latter in the event the quantity of fluid initially in said low pressure chamber does not entirely fill said ram cylinder, and manually operated means for moving said piston in said other direction.

FRANK T. COURT.

REFERENCES CITED

The following references are of record in the file of this patent:

UNITED STATES PATENTS

| Number | Name | Date |
|---|---|---|
| 198,176 | Alexander | Dec. 18, 1877 |
| 637,461 | Hartness | Nov. 21, 1899 |
| 986,065 | Janney | Mar. 7, 1911 |
| 1,162,997 | Ferguson | Dec. 7, 1915 |
| 1,409,786 | Sansbury | Mar. 14, 1922 |
| 1,499,007 | Edwards | June 24, 1924 |
| 1,786,912 | Madden | Dec. 30, 1930 |
| 1,852,544 | Weaver | Apr. 5, 1932 |

(Other references on following page)

UNITED STATES PATENTS

| Number | Name | Date |
|---|---|---|
| 1,903,887 | Widener | Apr. 18, 1933 |
| 1,918,426 | Radnor | July 18, 1933 |
| 2,018,269 | Kuchar | Oct. 22, 1935 |
| 2,081,607 | Stockard | May 25, 1937 |
| 2,092,251 | Heidloff | Sept. 7, 1937 |
| 2,096,574 | Denny | Oct. 19, 1937 |
| 2,103,530 | Henry | Dec. 28, 1937 |
| 2,211,479 | Pomeroy | Aug. 13, 1940 |
| 2,264,560 | Albertson | Dec. 2, 1941 |
| 2,293,071 | Morgensen | Aug. 18, 1942 |

FOREIGN PATENTS

| Number | Country | Date |
|---|---|---|
| 298,612 | Great Britain | 1930 |